US009019850B2

United States Patent
Chen et al.

(10) Patent No.: US 9,019,850 B2
(45) Date of Patent: Apr. 28, 2015

(54) CSI REPORTING FOR MULTIPLE CARRIERS WITH DIFFERENT SYSTEM CONFIGURATIONS

(75) Inventors: Wanshi Chen, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 13/443,437

(22) Filed: Apr. 10, 2012

(65) Prior Publication Data

US 2012/0257524 A1 Oct. 11, 2012

Related U.S. Application Data

(60) Provisional application No. 61/474,227, filed on Apr. 11, 2011.

(51) Int. Cl.
- *H04J 1/16* (2006.01)
- *H04J 3/14* (2006.01)
- *H04L 1/00* (2006.01)

(Continued)

(52) U.S. Cl.
CPC ............. *H04W 24/10* (2013.01); *H04B 7/0417* (2013.01); *H04B 7/0626* (2013.01); *H04B 7/063* (2013.01); *H04B 7/0632* (2013.01); *H04B 7/0639* (2013.01); *H04L 1/0026* (2013.01); *H04L 5/001* (2013.01); *H04L 5/0023* (2013.01);

(Continued)

(58) Field of Classification Search
None
See application file for complete search history.

(56) References Cited

U.S. PATENT DOCUMENTS

2010/0234037 A1* 9/2010 Terry et al. ............. 455/450
2010/0322175 A1* 12/2010 Chen ..................... 370/329

(Continued)

FOREIGN PATENT DOCUMENTS

| EP | 2230786 A1 | 9/2010 |
|----|------------|--------|
| EP | 2355567 A1 | 8/2011 |

(Continued)

OTHER PUBLICATIONS

ITU-R Ad Hoc: "LTE-Advanced" material for Rec. ITU-R M. [IMT. RSPEC], 3GPP Draft; RT-110016, 3RD Generation Partnership Project (3GPP), Mobile Competence Centre ; 650, Route Des Lucioles ; F-06921 Sophia-Antipolis Cedex ; France, vol. RAN WG2, No. Dublin, Ireland; 20110117, Jan. 18, 2011, XP050493096, [retrieved on Jan. 18, 2011].

(Continued)

*Primary Examiner* — Noel Beharry
*Assistant Examiner* — Kodzovi Acolatse
(74) *Attorney, Agent, or Firm* — Patterson & Sheridan, L.L.P.

(57) ABSTRACT

Techniques to support periodic reporting of channel state information (CSI) for multiple component carriers (CCs) with different system configurations are disclosed. A user equipment (UE) is configured with multiple CCs for carrier aggregation. Each CC is associated with a particular system configuration, which indicates whether FDD or TDD is utilized and, if TDD is utilized, a particular uplink-downlink configuration for the CC. Each CC is associated with a set of subframes available to send CSI on that CC, which is determined based on the system configuration of the CC. The multiple CCs configured for the UE include at least two CCs associated with different system configurations and different sets of subframes available to send CSI. The UE sends CSI for a first CC on a second CC based on a set of subframes available to send CSI on the second CC.

32 Claims, 10 Drawing Sheets

(51) Int. Cl.
*H04L 12/26* (2006.01)
*H04J 3/00* (2006.01)
*H04W 4/00* (2009.01)
*H04W 24/10* (2009.01)
*H04L 5/00* (2006.01)
*H04L 5/14* (2006.01)
*H04B 7/04* (2006.01)
*H04B 7/06* (2006.01)

(52) U.S. Cl.
CPC ............ *H04L5/0057* (2013.01); *H04L 5/0064* (2013.01); *H04L 5/0083* (2013.01); *H04L 5/14* (2013.01)

(56) References Cited

U.S. PATENT DOCUMENTS

| | | |
|---|---|---|
| 2011/0249578 A1 | 10/2011 | Nayeb Nazar et al. |
| 2011/0249582 A1 | 10/2011 | Choi et al. |
| 2011/0261714 A1 | 10/2011 | Pan et al. |
| 2011/0269490 A1 | 11/2011 | Earnshaw et al. |
| 2012/0044894 A1 | 2/2012 | Ko et al. |
| 2012/0147773 A1* | 6/2012 | Kim et al. ............... 370/252 |
| 2013/0242821 A1* | 9/2013 | Wei et al. ............... 370/280 |

FOREIGN PATENT DOCUMENTS

| | | |
|---|---|---|
| JP | 2012520643 A | 9/2012 |
| JP | 2013503567 A | 1/2013 |
| JP | 2013507067 A | 2/2013 |
| WO | 2010051752 A1 | 5/2010 |
| WO | WO-2010105653 A2 | 9/2010 |
| WO | 2010131919 A2 | 11/2010 |
| WO | WO-2011025816 A1 | 3/2011 |
| WO | 2011041623 A1 | 4/2011 |
| WO | 2011/122911 A2 | 10/2011 |

OTHER PUBLICATIONS

LG Electronics: "Details of eiCIC in Macro-Pico case", 3GPP Draft; R1-106143, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; 20101115, Nov. 9, 2010, XP050489602.

LG Electronics: "Performance of C RE and resource specific CSI", 3GPP Draft; R1-106145 CRE and Resource Specific CSI, 3rd Generation Partnership Project (3GPP), Mobile Competence Centre; 650, Route Des Lucioles ; F06921 Sophia-Antipolis Cedex ; France, vol. Ran WG1, No. Jacksonville, USA; 20101115, Nov. 9, 2010, XP050489604.

Partial International Search Report—PCT/US2012/033076—ISA/EPO—Jan. 3, 2013.

Alcatel-Lucent et al., "Periodic CQI/PMI/RI reporting in case of multiple DL CCs", 3GPP Draft; R1-110219 Periodic CSI Report Final, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; 20110117, Jan. 12, 2011, XP050490320, [retrieved on Jan. 12, 2011].

Ericsson et al: "Rel-10 UE capabilities", 3GPP Draft; R2-110496 REL-10 UE Capabilities, 3rd Generation Partnership Project (3GPP), Mobile Competence Centre ; 650, Route Des Lucioles; F-06921 Sophia-Antipolis Cedex ; France, vol. RAN WG2, No. Dublin, Ireland; 20110117, Jan. 18, 2011, XP050493093, [retrieved on Jan. 18, 2011].

"International Search Report and Written Opinion—PCT/US2012/033076—ISA/EPO—Mar. 25, 2013".

Mediatek Inc: "Collision Handling for Periodic CSI Reporting in Subframe Subsets", 3GPP Draft; R1-110142 Collision Handling for Periodic CSI Reporting, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; 20110117, Jan. 12, 2011, XP050490315, [retrieved on Jan. 12, 2011].

Qualcomm Incorporated: "CQI for CA", 3GPP Draft; R1-103537 CQI for CA, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20100628, Jun. 22, 2010, XP050449044, [retrieved on Jun. 22, 2010].

Nokia Siemens Networks: "Periodic CSI reporting for Carrier Aggregation", 3GPP TSG RAN WG1 Meeting #63bis R1-110434, Jan. 17, 2011, 2 pages.

* cited by examiner

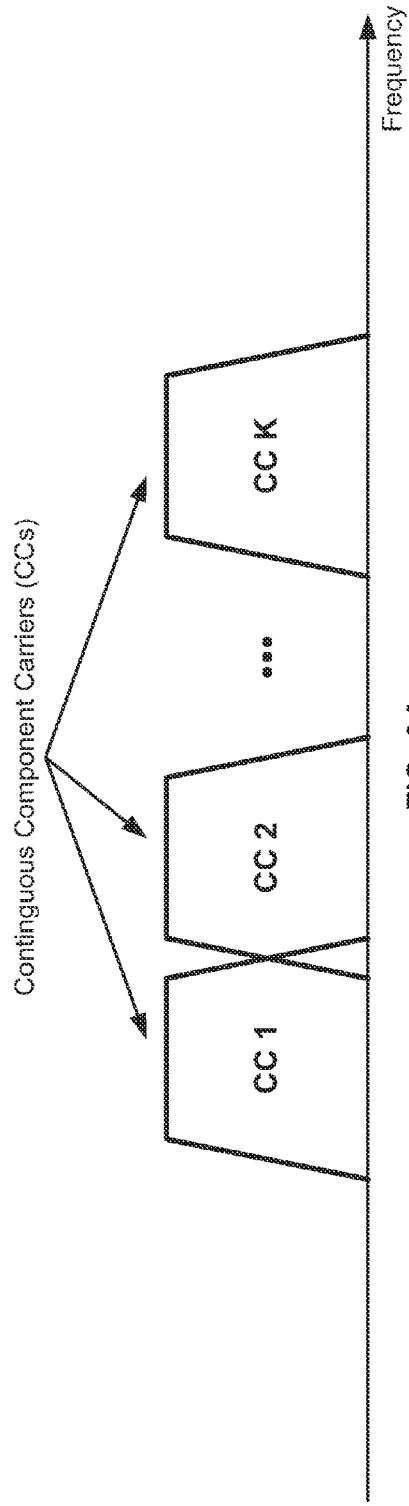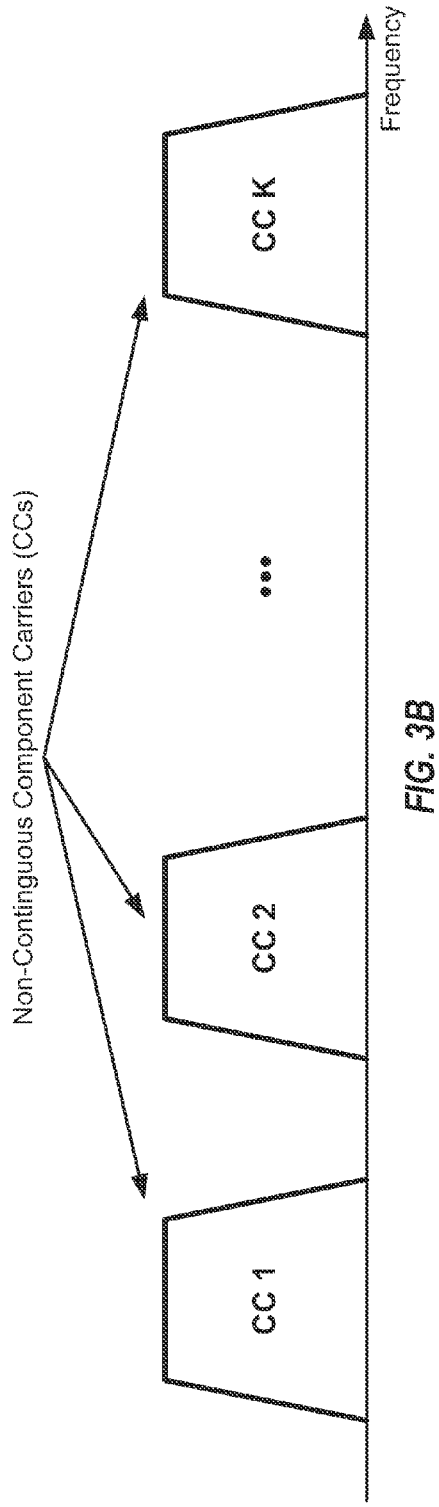

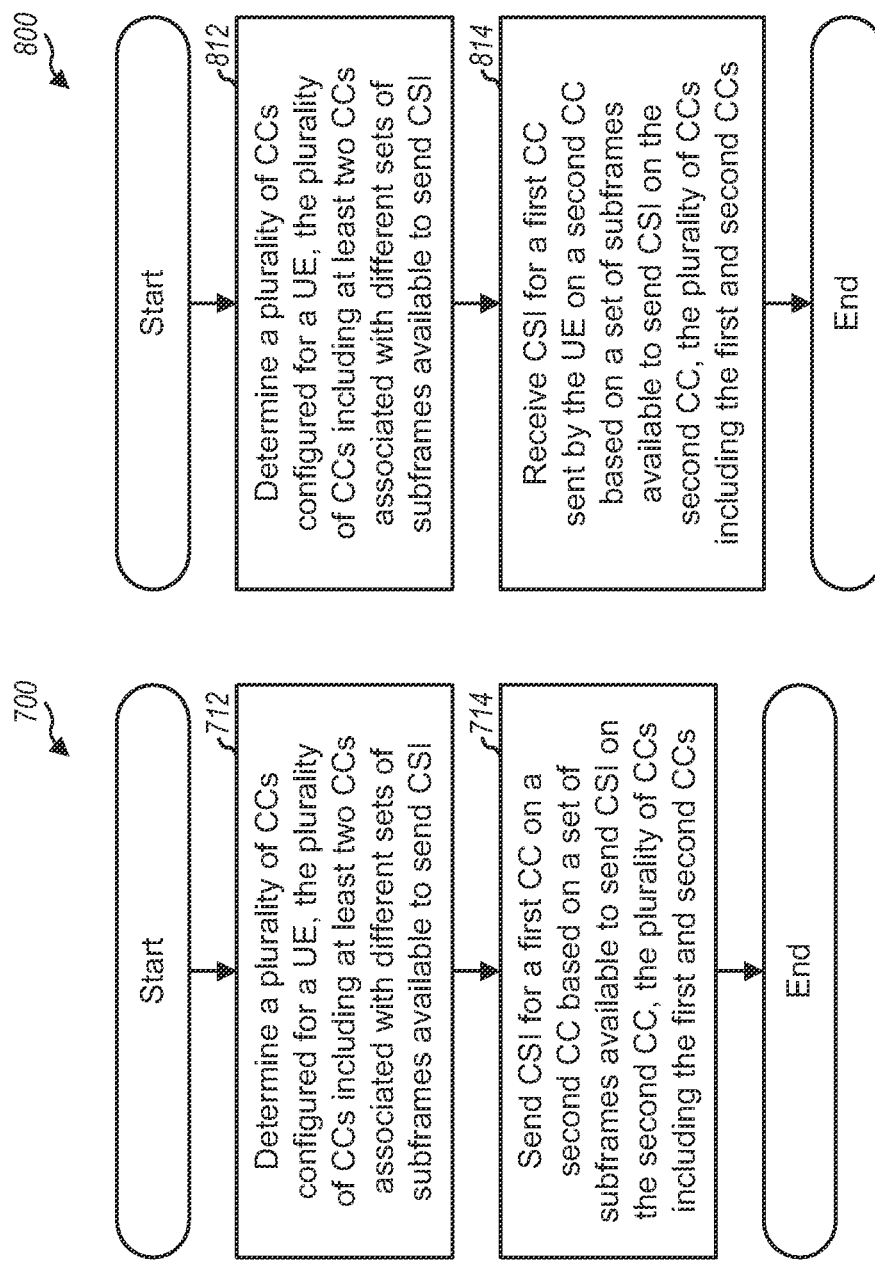

CSI REPORTING FOR MULTIPLE CARRIERS WITH DIFFERENT SYSTEM CONFIGURATIONS

CLAIM OF PRIORITY UNDER 35 U.S.C. §119

The present Application for Patent claims priority to Provisional U.S. Application Ser. No. 61/474,227, entitled "FDD-TDD CARRIER AGGREGATION AND PERIODIC CQI REPORTING," filed Apr. 11, 2011, assigned to the assignee hereof, and expressly incorporated herein by reference.

BACKGROUND

I. Field

The present disclosure relates generally to communication, and more specifically to techniques for transmitting control information in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple component carriers (CCs). A CC may refer to a range of frequencies used for communication and may be associated with certain characteristics. For example, a CC may be associated with system information defining operation on the CC. A CC may also be referred to as a carrier, a frequency channel, a cell, etc. A base station may send data and control information on one or more CCs to a UE. The UE may send control information to support data transmission by the base station.

SUMMARY

Techniques to support periodic reporting of channel state information (CSI) for multiple CCs with different system configurations are disclosed herein. A UE may be configured with a plurality of CCs for carrier aggregation. Each CC may be associated with a particular system configuration, which may indicate whether frequency division duplex (FDD) or time division duplex (TDD) is utilized for the CC and, if TDD is utilized, a particular uplink-downlink configuration for the CC. Each CC may be associated with a set of subframes available to send CSI on that CC, which may be determined based on the system configuration of the CC. The plurality of CCs configured for the UE may include at least two CCs associated with different system configurations and hence different sets of subframes available to send CSI.

The UE may obtain a periodic CSI reporting configuration for each of the plurality of CCs. In one design, the periodic CSI reporting configuration for each CC may be independently determined for that CC, e.g., based on the system configuration of the CC. In another design, the periodic CSI reporting configuration for a given CC X may be determined based on the system configuration of another CC Y on which CSI for CC X is sent.

The UE may send CSI for a first CC on a second CC based on a set of subframes available to send CSI on the second CC. The first and second CCs may be among the plurality of CCs configured for the UE. In one design, the plurality of CCs may be arranged in at least two groups, with each group including at least one CC having the same system configuration. The first and second CCs may be in the same group. The UE may send CSI for each CC in each group on one of the at least one CC in the group. In another design, the UE may send CSI for each of the plurality of CCs on a designated CC. All of the plurality of CCs may be associated with the same designated CC. Alternatively, each CC may be associated with a designated CC selected for that CC. In any case, the designated CC may be associated with the largest number of subframes available to send CSI and/or may be determined based on other criteria. In yet another design, the UE may send CSI for each of the plurality of CCs on a primary CC used by the UE to send uplink control information.

Various aspects and features of the disclosure are described in further detail below.

BRIEF DESCRIPTION OF THE DRAWINGS

FIG. 3A shows carrier aggregation with contiguous CCs.
FIG. 3B shows carrier aggregation with non-contiguous CCs.
FIG. 7 shows a process for sending CSI for multiple CCs with different system configurations.
FIG. 8 shows a process for receiving CSI for multiple CCs with different system configurations.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both FDD and TDD, are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Figure 1:
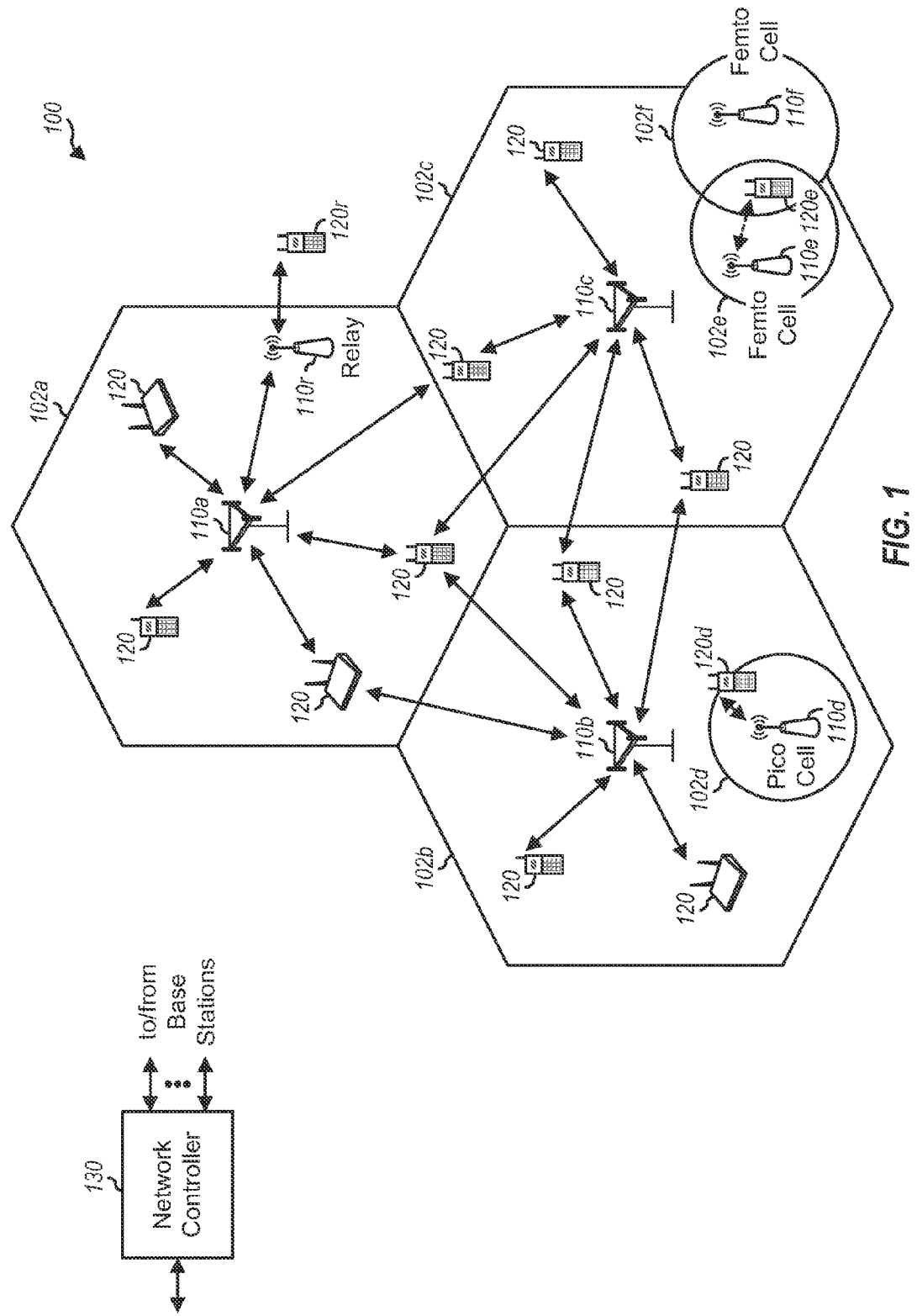
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be femto eNBs for femto cells 102e and 102f, respectively. An eNB may support one or multiple (e.g., three) cells.

Wireless network 100 may also include relays. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 (e.g., 120d, 120e, etc.) may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a netbook, a smartbook, a wireless communication device, a handheld device, a laptop computer, a cordless phone, a wireless local loop (WLL) station, etc. A UE may be able to communicate with macro eNBs, pico eNBs, femto eNBs, relays, etc.

Wireless network 100 may utilize FDD and/or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods.

Figure 2A:
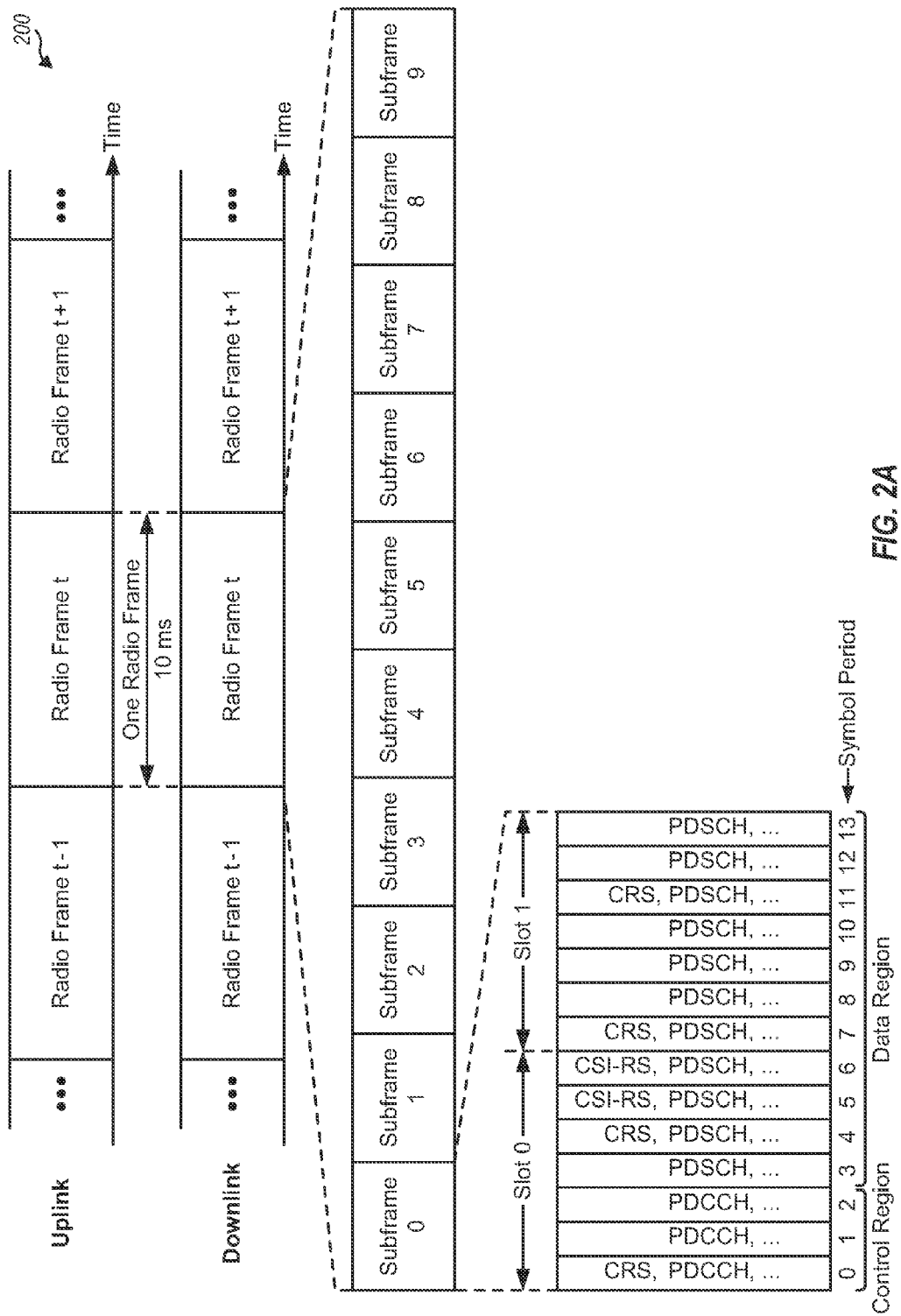
FIG. 2A shows an exemplary frame structure for FDD.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2A) or six symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

Figure 2B:
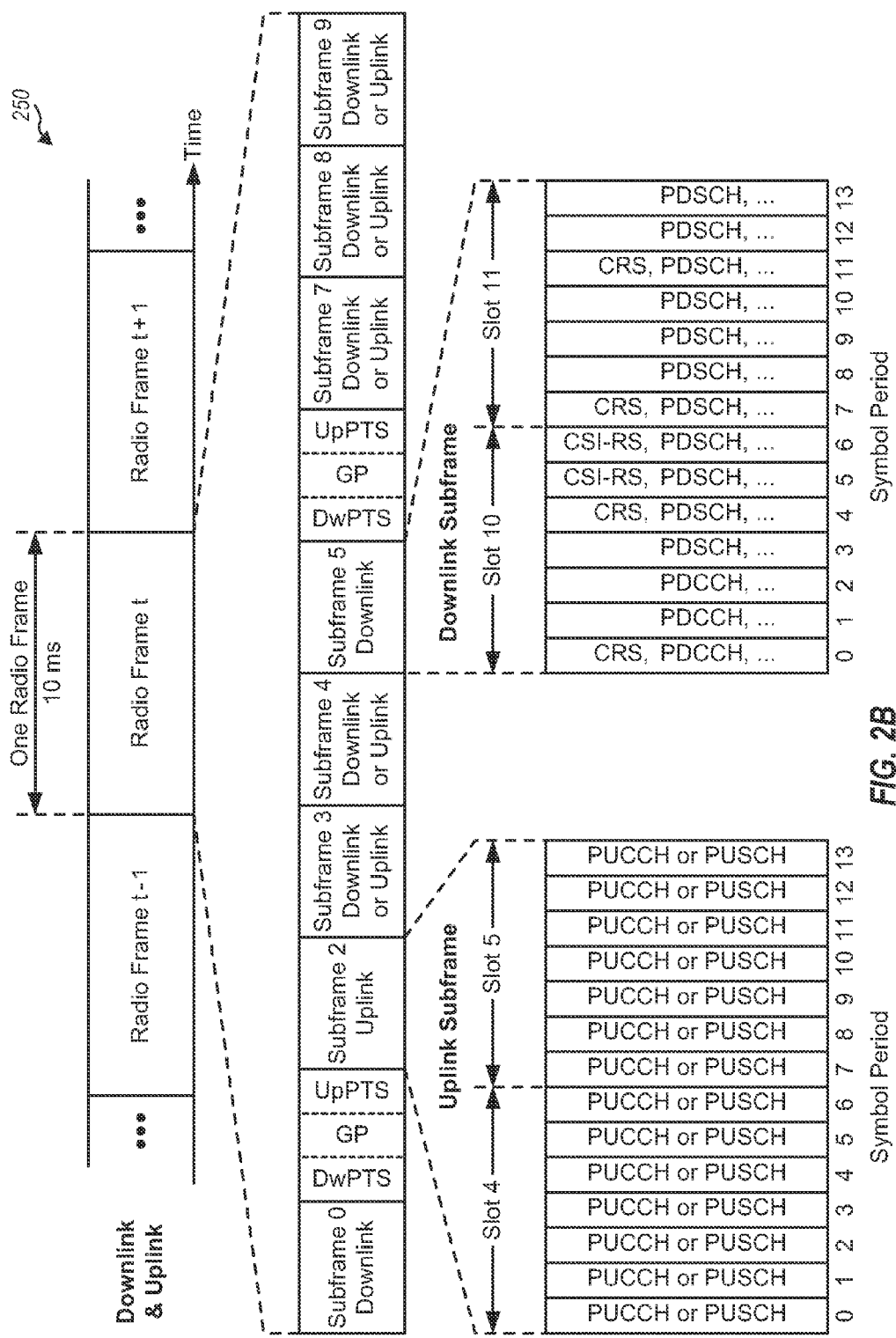
FIG. 2B shows an exemplary frame structure for TDD.

FIG. 2B shows an exemplary frame structure 250 for TDD in LTE. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes a Downlink Pilot Time Slot (DwPTS), a Guard Period (GP), and an Uplink Pilot Time Slot (UpPTS). Subframe 6 may include only the DwPTS, or all three special fields, or a downlink subframe depending on the uplink-downlink configuration.

Table 1 lists seven uplink-downlink configurations supported by LTE for TDD. Each uplink-downlink configuration indicates whether each subframe is a downlink subframe (denoted as "D" in Table 1), or an uplink subframe (denoted as "U" in Table 1), or a special subframe (denoted as "S" in Table 1).

TABLE 1

Uplink-Downlink Configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For both FDD and TDD, a subframe used for the downlink may be referred to as a downlink subframe. A subframe used for the uplink may be referred to as an uplink subframe. A CC configured for FDD may be referred to as an FDD CC. A CC configured for TDD may be referred to as a TDD CC.

For both FDD and TDD, a cell may transmit a Physical Downlink Control Channel (PDCCH) and/or other physical channels in a control region of a downlink subframe. The PDCCH may carry downlink control information (DCI) such as downlink grants, uplink grants, etc. The cell may also transmit a Physical Downlink Shared Channel (PDSCH) and/or other physical channels in a data region of a downlink subframe. The PDSCH may carry data for UEs scheduled for data transmission on the downlink.

A cell may also transmit a cell-specific reference signal (CRS) in certain symbol periods of each downlink subframe. A reference signal is a signal that is known a priori by a transmitter and a receiver and may also be referred to as pilot. A CRS is a reference signal that is specific for a cell, e.g., generated based on a cell identity (ID). The cell may transmit a CRS from two antenna ports 0 and 1 in symbol periods 0, 4, 7 and 11 of each subframe (as shown in FIG. 2A). The cell may also transmit the CRS from two additional antenna ports 2 and 3 in symbol periods 1 and 8 of each subframe (not shown in FIG. 2A). The cell may transmit the CRS on evenly spaced subcarriers, which may be determined based on the cell ID.

A cell may also transmit a CSI reference signal (CSI-RS) in certain symbol periods of certain subframes. For example, the CSI-RS may be transmitted every 5 ms in subframes 0 and 5 of each radio frame. The CSI-RS may also be transmitted with other periodicity and/or in other subframes. The CSI-RS may be used for various purposes such as channel measurement, channel feedback reporting, etc.

For both TDD and FDD, a UE may transmit either a Physical Uplink Control Channel (PUCCH) in a control region of an uplink subframe or a Physical Uplink Shared Channel (PUSCH) in a data region of the uplink subframe. The PUCCH may carry uplink control information (UCI) such as CSI to support data transmission on the downlink, scheduling request, etc. The PUSCH may carry data and/or UCI.

The various signals and channels in LTE are described in 3GPP TS 36.211, entitled "Evolved Universal Terrestrial Radio Access (E-UTRA); Physical Channels and Modulation," which is publicly available.

Wireless network 100 may support operation with multiple CCs, which may be referred to as carrier aggregation (CA) or multi-carrier operation. A UE may be configured with multiple CCs for the downlink and one or more CCs for the uplink for carrier aggregation. An eNB may send data and DCI on one or more CCs to the UE. The UE may send data and UCI on one or more CCs to the eNB.

FIG. 3A shows an example of continuous carrier aggregation. K CCs may be available for communication and may be adjacent to each other, where K may be any integer value.

FIG. 3B shows an example of non-continuous carrier aggregation. K CCs may be available for communication and may be separate from each other.

In LTE Release 10, for example, a UE may be configured with up to five CCs for carrier aggregation. Each CC may have a bandwidth of up to 20 MHz and may be backward compatible with LTE Release 8. The UE may thus be configured with up to 100 MHz for up to five CCs. One CC may be designated as a primary downlink CC, and one CC may be designated as a primary uplink CC. An eNB may send the PDCCH in a common search space on the primary downlink CC. The UE may send the PUCCH on the primary uplink CC.

A CC may be associated with a particular system configuration, which may also be referred to as system type, CC type, CC configuration, etc. The system configuration of the CC may indicate whether FDD or TDD is utilized for the CC, a particular uplink-downlink configuration for the CC if TDD is utilized, downlink subframes and uplink subframes for the CC, etc.

LTE Release 10 supports carrier aggregation for multiple CCs with the same system configuration. In particular, all CCs for carrier aggregation are configured for either FDD or TDD, and a mixture of FDD CCs and TDD CCs are not allowed. Furthermore, if the CCs are configured for TDD, then all CCs have the same uplink-downlink configuration, although special subframes may be configured separately for different CCs. Restricting all CCs to have the same FDD or TDD configuration as well as the same uplink-downlink configuration may simplify operation.

LTE Release 11 and/or later may support carrier aggregation for multiple CCs with different system configurations. For example, an aggregation of FDD CCs and TDD CCs may be supported. As another example, an aggregation of CCs with different uplink-downlink configurations may be supported. The different uplink-downlink configurations for different CCs may be due to different uplink-downlink configurations for TDD, e.g., as shown in Table 1. The different uplink-downlink configurations for different CCs may also be due to partitioning of downlink and uplink subframes to support operation of relays, home eNBs, pico eNBs, etc. Supporting CCs with different system configurations may provide more flexibility in deployment. Each CC may be backward compatible to a single CC in LTE Release 8, 9 or 10 in a single carrier mode. It may also be possible to support non-backward compatible CCs, e.g., CC segments, extension CCs, etc.

Figure 4:
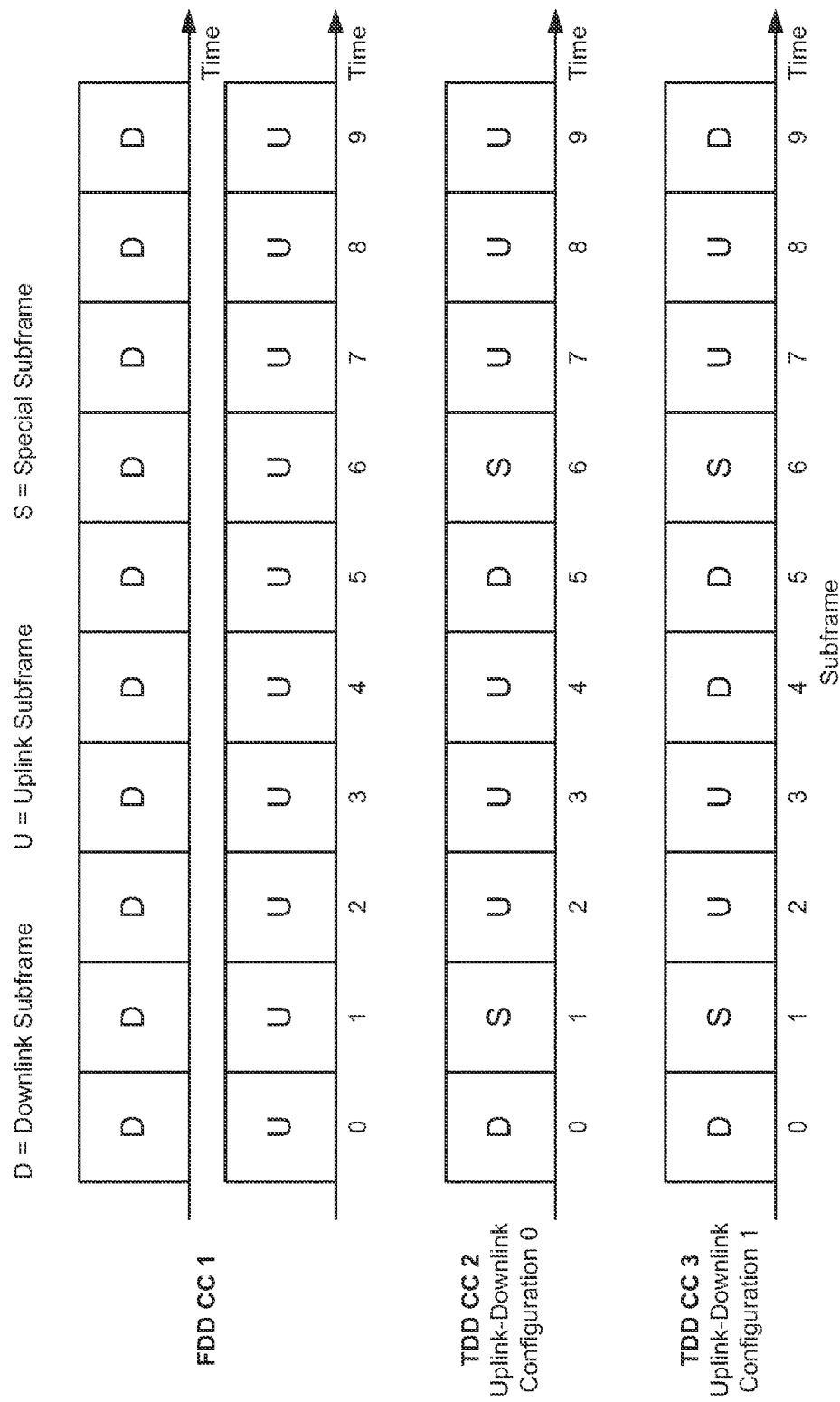
FIG. 4 shows an example of three CCs with different system configurations.

FIG. 4 shows an example of three CCs with different system configurations. In this example, CC 1 is configured for FDD and includes a downlink frequency channel and an uplink frequency channel. The downlink frequency channel includes downlink subframes, which are denoted as "D" in FIG. 4. The uplink frequency channel includes uplink subframes, which are denoted as "U" in FIG. 4. CC 2 is configured for TDD with uplink-downlink configuration 0. Subframes 0 and 5 of CC 2 are downlink subframes, subframes 1 and 6 of CC 2 are special subframes, and remaining subframes 2-4 and 7-9 of CC 2 are uplink subframes. CC 3 is configured for TDD with uplink-downlink configuration 1. Subframes 0, 4, 5 and 9 of CC 3 are downlink subframes, subframes 1 and 6 of CC 3 are special subframes, and remaining subframes 2, 3, 7 and 8 of CC 3 are uplink subframes.

As shown in FIG. 4, multiple CCs (e.g., CCs 1 and 2) may have different system configurations due to FDD and TDD. Multiple CCs (e.g., CC 2 and CC 3) may also have different system configurations due to different uplink-downlink configurations for TDD. FIG. 4 shows an example of three CCs with different system configurations. In general, any number of CCs may be supported. Different CCs may have different system configurations due to different FDD or TDD configurations, different uplink-downlink configurations, etc.

A UE may send CSI to an eNB to support data transmission on the downlink. CSI may include channel quality indicator (CQI), precoding matrix indicator (PMI), channel direction indication (CDI), precoding type indicator (PTI), rank indicator (RI), and/or other information. RI may indicate the number of layers to use for data transmission. Each layer may be viewed as a spatial channel. PTI may indicate a precoding type feedback, e.g., wideband versus subband. PMI may indicate a precoding matrix or vector to use for precoding data prior to transmission. CDI may indicate a spatial direction (e.g., a dominant eigenvector) for transmitting data. CQI may indicate a channel quality for each of at least one packet to send. CSI may also include other information used to transmit data.

A UE may be configured to periodically report CSI to an eNB. This periodic CSI reporting may be configured for the UE via upper layer signaling, e.g., via Radio Resource Control (RRC) signaling. The UE may also be requested to report CSI in a given subframe via a CSI request sent on the PDCCH. This aperiodic CSI reporting may be initiated by the eNB when and as needed.

A UE may be configured to operate on multiple CCs for carrier aggregation and may be configured to periodically report CSI for the multiple CCs to an eNB. The UE may have a particular configuration for periodic CSI reporting for each CC. The periodic CSI reporting configuration for a given CC may indicate which types of CSI (e.g., CQI, PMI, CDI, PTI, and/or RI) to report for that CC, the periodicity of reporting each type of CSI, the subframes in which to report each type of CSI, etc. The periodicity for reporting CSI may be selected from a set of possible periodicities, e.g., 2, 5, 10, 20, . . . , ms. The specific subframes in which to report CSI may be given by an offset relative to a system frame number and/or a subframe number. The UE may be configured to report different types of CSI at different periodicities and/or with different offsets. For example, the UE may be configured to report CQI and PMI at a first periodicity with a first offset and to report RI at a second periodicity with a second offset. The periodicity and offset for reporting CQI and/or PMI may be given by a parameter $I_{CQI/PMI}$. The periodicity and offset for reporting RI may be given by a parameter $I_{RI}$.

A UE may be configured for operation on multiple CCs with carrier aggregation and may be independently configured for periodic CSI reporting on each CC. The same periodic CSI reporting configuration may be applicable for all CCs. Alternatively, different periodic CSI reporting configurations may be applicable for different CCs. In any case, the UE may periodically send CSI for each CC based on the periodic CSI reporting configuration for that CC.

A UE may be able to send CSI for only one CC or multiple CCs in a given subframe. If the UE has CSI for multiple CCs to send in a given subframe, then the UE may send CSI for the CC with the highest priority and may drop (i.e., not send) CSI for the other CCs. The highest priority CC may be determined based on CSI reporting type. Each CC may be associated with a particular CSI reporting type in a subframe. The CSI reporting type may indicate which type of CSI to report, whether the CSI is for a subband or wideband, etc. The highest priority CC may be the CC with the CSI reporting type having the highest priority. If multiple CCs are associated with CSI reporting types having the highest priority, then the highest priority CC may be determined based on the priorities of the multiple CCs, as configured by upper layer via RRC signaling. The UE may have multiple types of CSI to report for a given CC (e.g., the highest priority CC) in a given subframe. The UE may report one or more types of CSI based on the priorities assigned to the different types of CSI.

Figure 5:
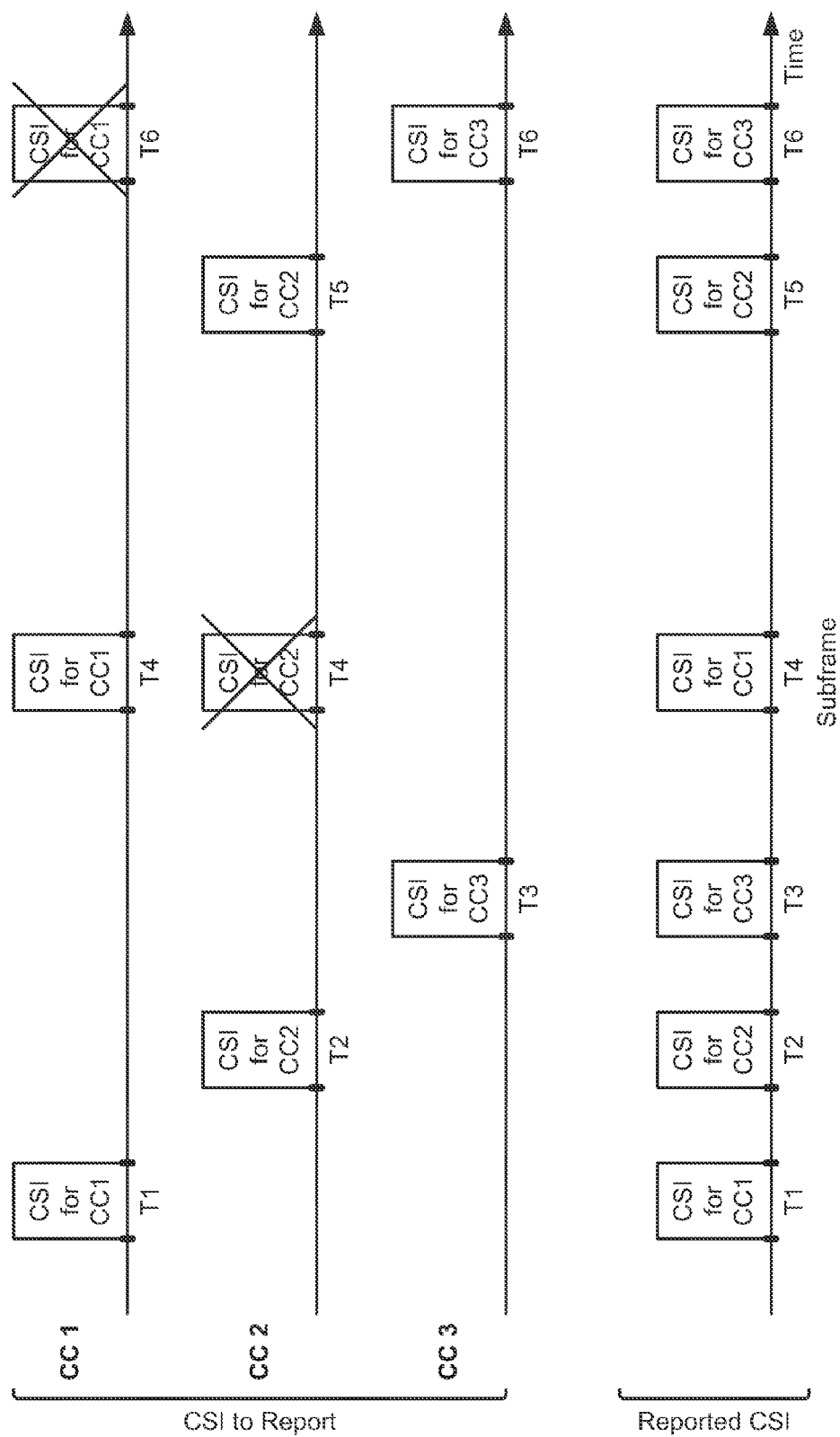
FIG. 5 shows an example of sending CSI for three CCs by a UE.

FIG. 5 shows an example of sending CSI for three CCs by a UE. The UE may have different periodic CSI reporting configurations for the three CCs. The periodic CSI reporting configuration for each CC may direct the UE to send CSI with a particular periodicity and a particular offset. The UE may send CSI for CC 1 in subframe T1, CSI for CC 2 in subframe T2, and CSI for CC 3 in subframe T3. The UE may have CSI for CCs 1 and 2 to report in subframe T4, and a collision may occur in this subframe. The UE may report CSI for CC 1 (which may have the highest priority among CCs 1 and 2) and may drop CSI for CC 2. The UE may report CSI for CCs 1, 2 and 3 in subsequent subframes in similar manner.

A UE may be configured with multiple CCs of the same system configuration for carrier aggregation. In this case, all of the CCs may be FDD or TDD and may have the same uplink-downlink configuration if TDD. Periodic CSI reporting may be independently configured for each CC without any complication. The UE may send CSI for a given CC on (i) the PUCCH on the primary uplink CC or (ii) the PUSCH on a CC on which the UE is scheduled for data transmission. CSI for a given CC X may thus be sent on another CC Y instead of CC X. If all CCs have the same system configuration, then each subframe may be either a downlink subframe or an uplink subframe for all CCs, and all CCs would have the same set of uplink subframes. Hence, if a given subframe n of CC X is an uplink subframe available to send CSI, then subframe n of all other CCs (including CC Y) is also an uplink subframe available to send CSI. This means that periodic CSI reporting can be independently configured for each CC based on the system configuration of that CC, without having to worry whether CSI for that CC can be sent on another CC.

A UE may be configured with multiple CCs having different system configurations for carrier aggregation, e.g., as shown in FIG. 4. In this case, the periodic CSI reporting configuration of a given CC X may be impacted by the system configuration of another CC Y on which CSI for CC X is sent. CC X may have specific downlink subframes and uplink subframes, which may be determined based on the system configuration of CC X. Periodic CSI reporting for CC X may be configured based on the system configuration of CC X, so that CSI for CC X can be scheduled to be sent only in uplink subframes of CC X. A subframe in which CSI is sent may be referred to as a reporting subframe. However, the reporting subframes for CC X may not correspond to uplink subframes for CC Y on which CSI for CC X is sent. For example, referring to FIG. 4, CSI for CC 1 may be scheduled to be sent in subframe 4 in FIG. 4 based on periodic CSI reporting configuration of CC 1. CSI for CC 1 may be sent on CC 3. In this case, the CSI for CC 1 cannot be sent on CC 3 in subframe 4 since this is a downlink subframe for CC 3. In general, periodic CSI reporting for multiple CCs with different system configurations may be complicated by different uplink subframes being available on different CCs to send CSI.

Various schemes may be used to support periodic CSI reporting for multiple CCs with different system configurations. Some exemplary schemes are described below.

In a first scheme to support periodic CSI reporting for multiple CCs with different system configurations, periodic CSI reporting may be independently configured for each CC, and CSI for each CC may be sent on any CC having the same system configuration. A UE may be configured with multiple CCs for carrier aggregation. The multiple CCs may be arranged into groups based on their system configurations, so that each group includes CCs with the same system configuration. For each group, each CC in the group may be independently configured for periodic CSI reporting. The CSI for each CC in the group may be sent on any CC in the group since all CCs in the group have the same system configuration and hence the same uplink subframes.

Figure 6A:
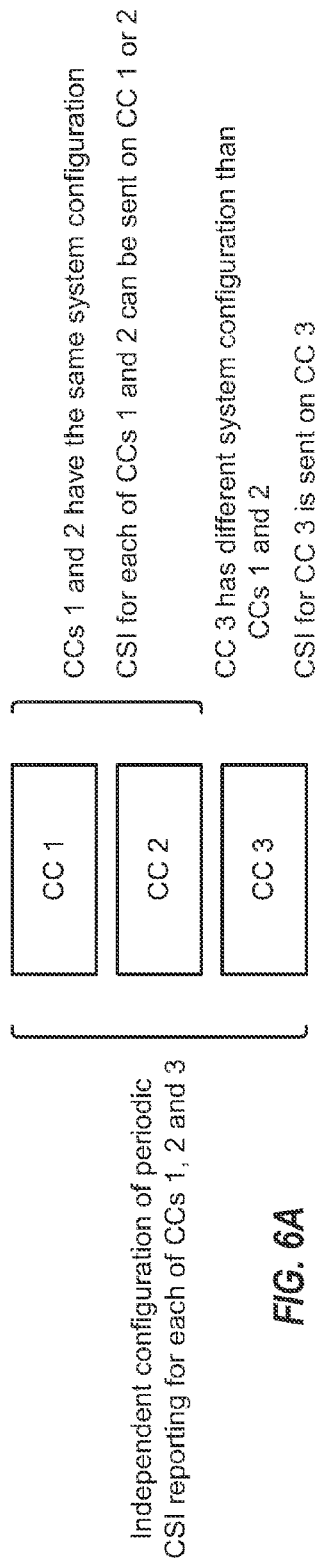
FIGS. 6A to 6C show three schemes to support periodic CSI reporting for multiple CCs with different system configurations.

FIG. 6A shows an example of periodic CSI reporting for multiple CCs with different system configurations in accordance with the first scheme. A UE may be configured with three CCs for carrier aggregation. CCs 1 and 2 have the same system configuration, and CC 3 has a different system configuration than that of CCs 1 and 2. A first group may be defined to include CCs 1 and 2, and a second group may be defined to include only CC 3. Periodic CSI reporting may be independently configured for each of CCs 1, 2 and 3. CSI for CC 1 and CSI for CC 2 may be sent on either CC 1 or 2. CSI for CC 3 may be sent on CC 3.

In the first scheme, CSI for each CC may be sent on any CC having the same system configuration. This may enable each CC to be independently configured without having to worry about whether uplink subframes are available to send CSI for the CC. The first scheme may provide flexibility in the selection of CCs on which to send CSI.

In a second scheme to support periodic CSI reporting for multiple CCs with different system configurations, periodic CSI reporting may be independently configured for each CC, and CSI for a CC may be sent on a designated CC. The designated CC may be selected based on the system configurations of the CCs and/or other criteria. For example, the designated CC may be a CC with the largest number of uplink subframes, or a CC with a superset of uplink subframes as compared to a CC for which CSI is reported, etc. In one design, CSI for all CCs may be sent in one designated CC, which may be selected for all CCs. In another design, different designated CCs may be selected for different CCs, and CSI for each CC may be sent on its designated CC.

In one design, if a UE is configured with an FDD CC and a TDD CC, then CSI for both CCs may be sent on the FDD CC. In one design, if a UE is configured with multiple TDD CCs, then CSI for all or some CCs may be sent on the TDD CC with the largest number of uplink subframes. For example, if the UE is configured with one TDD CC with uplink-downlink configuration 1 and another TDD CC with uplink-downlink configuration 2, then CSI for both CCs may be sent on the TDD CC with uplink-downlink configuration 1 having more uplink subframes.

Figure 6B:
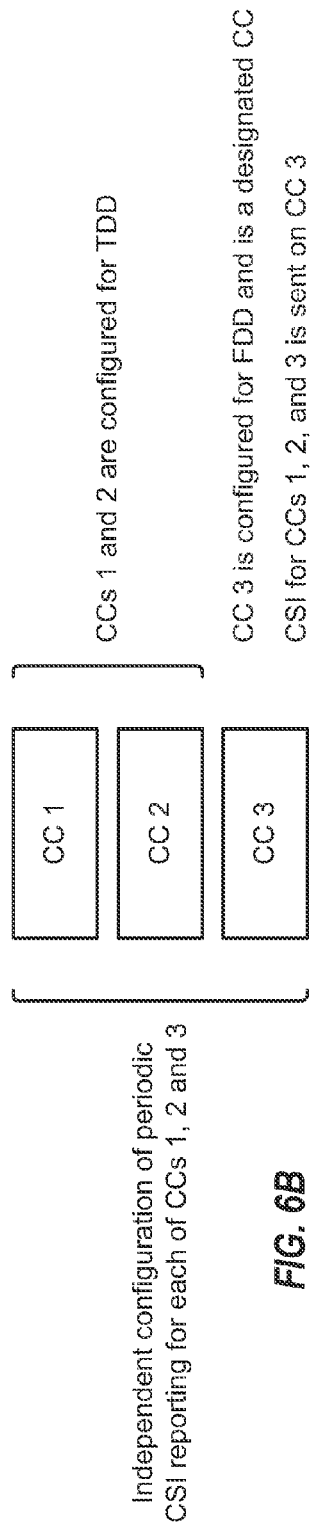

FIG. 6B shows an example of periodic CSI reporting for multiple CCs with different system configurations in accordance with the second scheme. A UE may be configured with three CCs for carrier aggregation. CCs 1 and 2 are TDD CCs with the same or different uplink-downlink configurations, and CC 3 is an FDD CC. Periodic CSI reporting may be independently configured for each of CCs 1, 2 and 3. CSI for CCs 1, 2 and 3 may be sent on CC 3, which has the largest number of uplink subframes.

In the second scheme, CSI for each CC may be sent on a designated CC applicable for that CC. This may reduce the likelihood of CSI being dropped due to unavailable uplink subframes on the designated CC to send the CSI. The second scheme may enable periodic CSI reporting to be independently configured for each CC while reducing the likelihood of CSI being dropped.

In a third scheme to support periodic CSI reporting for multiple CCs with different system configurations, periodic CSI reporting for each CC may be independently configured based on parameter values for a CC on which CSI is sent (and not based on parameter values for the CC for which CSI is reported). For example, periodic CSI reporting for an FDD CC may be configured based on a first set of periodicities and offsets available for FDD CCs. Similarly, periodic CSI reporting for a TDD CC may be configured based on a second set of periodicities and offsets available for TDD CCs. The first set of periodicities and offsets for FDD CCs may be different from the second set of periodicities and offsets for TDD CCs. Both sets of periodicities and offsets are given in 3GPP TS 36.213, entitled "Evolved Universal Terrestrial Radio Access (E-UTRA); Multiplexing and channel coding," which is publicly available.

In the third scheme, periodic CSI reporting for a given CC X may be configured based on the set of periodicities and offsets available for a CC Y on which CSI for CC X is sent, and not based on the set of periodicities and offsets available for CC X. Periodic CSI reporting for CC Y may also be configured based on the set of periodicities and offsets available for CC Y on which CSI for CC Y is sent. The periodic CSI reporting configuration for CC X may be different from the periodic CSI reporting configuration for CC Y even though the periodic CSI reporting configurations for both CCs X and Y are determined based on the same set of periodicities and offsets.

Figure 6C:
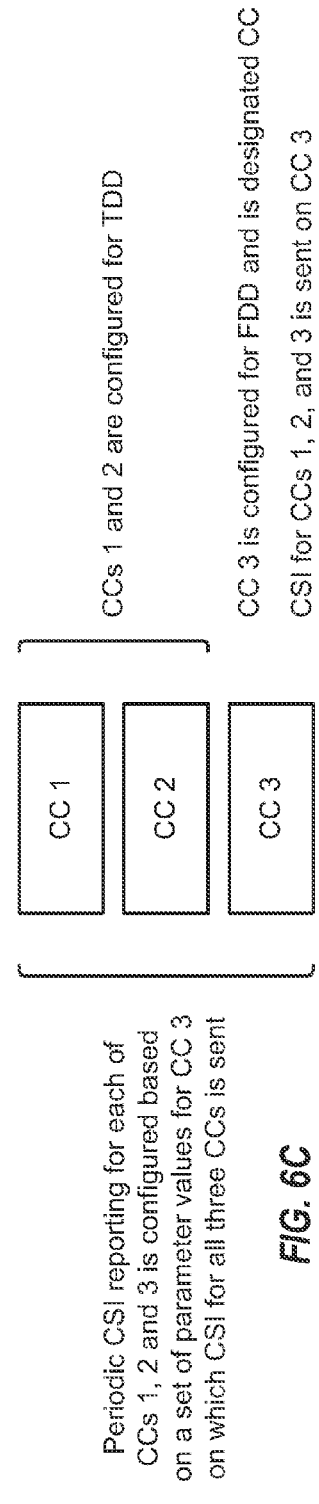

FIG. 6C shows an example of periodic CSI reporting for multiple CCs with different system configurations in accordance with the third scheme. A UE may be configured with three CCs for carrier aggregation. CCs 1 and 2 are TDD CCs with the same or different uplink-downlink configurations, and CC 3 is an FDD CC. CSI for all three CCs may be sent on CC 3. Periodic CSI reporting may be independently configured for each of CCs 1, 2 and 3 based on the set of periodicities and offsets available for CC 3.

In the third scheme, periodic CSI reporting for a TDD CC may be configured based on the set of periodicities and offsets available for an FDD CC on which CSI for the TDD CC is sent. Similarly, periodic CSI reporting for an FDD CC may be configured based on the set of periodicities and offsets available for a TDD CC on which CSI for the FDD CC is sent. The third scheme may enable periodic CSI reporting to be independently configured for each CC while ensuring that uplink subframes are available to send CSI for the CC.

In a fourth scheme to support periodic CSI reporting for multiple CCs with different system configurations, periodic CSI reporting may be independently configured for each CC, and CSI for all CCs may be sent on one or more designated CCs. A designated CC may be a primary uplink CC or a CC selected in other manners. In one design, CSI for all CCs may be sent on a single designated CC. In another design, CSI for all CCs may be sent on two or more designated CCs. For example, two or more primary uplink CCs may be configured for a UE and may serve as designated CCs.

The system configuration of a given CC X may be different from the system configuration of a designated CC for CSI feedback. In this case, the uplink subframes of CC X may not match the uplink subframes of the designated CC. CSI for CC X may be scheduled to be sent in uplink subframes of CC X based on the periodic CSI reporting configuration for CC X. Whenever CSI for CC X is scheduled to be sent in an uplink subframe of CC X that corresponds to a downlink subframe of the designated CC, CSI for CC X may be dropped or may be sent in the next available uplink subframe of the designated CC. Hence, sending CSI for CC X on another CC with a different system configuration may result in dropped and/or delayed CSI. To mitigate this problem, a UE may be scheduled for data transmission on the PUSCH on CC X and may then send CSI for CC X along with data on the PUSCH on CC X.

Four exemplary schemes to support periodic CSI reporting for multiple CCs with different system configurations are described above. Periodic CSI reporting for multiple CCs with different system configurations may also be supported in other manners. In general, a UE may be configured with a plurality of CCs, which may have different system configurations and hence different uplink subframes available to send CSI. CSI for a given CC X may be sent on another CC Y based on uplink subframes available for CC Y.

For all schemes described above, a UE may make measurements of a CRS, a CSI-RS, and/or other reference signals on a given CC X. The UE may determine CSI for CC X based on the measurements. The UE may be scheduled to send CSI for CC X in uplink subframe n based on the periodic CSI reporting configuration for CC X. The UE may make measurements for CC X in downlink subframe m, which may be the first valid downlink subframe that is at least four subframes earlier than uplink subframe n. A valid downlink subframe may be a downlink subframe that does not fall into a measurement gap, contains at least one reference signal, falls into a specific subset of subframes if configured by higher layer, etc. Having downlink subframe m be at least four subframes earlier than uplink subframe n may ensure sufficient time for measurement and reporting. This rule may apply regardless of whether CSI for CC X is sent on CC X or another CC Y. If CSI for CC X is sent on CC Y, then uplink subframe n is for CC Y, and downlink subframe m may be the first valid downlink subframe for CC X that is at least four subframes earlier than uplink subframe n for CC Y.

FIG. 7 shows a design of a process 700 for sending CSI for multiple CCs with different system configurations. Process 700 may be performed by a UE (as described below) or by some other entity. The UE may determine a plurality of CCs configured for the UE for carrier aggregation (block 712). The plurality of CCs may include at least two CCs associated with different sets of subframes available to send CSI. The UE may send CSI for a first CC on a second CC based on a set of subframes available to send CSI on the second CC (block 714). The first and second CCs may be among the plurality of CCs. The CSI may comprise CQI, PMI, CDI, PTI, RI and/or other information.

Each of the plurality of CCs may be associated with a particular system configuration. The system configuration for each CC may indicate whether FDD or TDD is utilized for the CC and, if TDD is utilized, a particular uplink-downlink configuration for the CC. Each of the plurality of CCs may be associated with a respective set of subframes available to send CSI on the CC, which may be determined based on the system configuration of the CC. The at least two CCs may be associated with at least two different system configurations. For example, the at least two CCs may include at least one CC configured for FDD and at least one other CC configured for TDD. Alternatively, the at least two CCs may be configured for TDD with different uplink-downlink configurations.

The UE may obtain a periodic CSI reporting configuration for each of the plurality of CCs. In one design, the periodic CSI reporting configuration for each CC may be independently determined for that CC, e.g., based on the system configuration of the CC. This design may be applicable for the first, second, and fourth schemes described above. In another design that may be applicable for the third scheme described above, the periodic CSI reporting configuration for a CC (e.g., the first CC) may be determined based on the system configuration of another CC (e.g., the second CC) on which the CSI for the CC is sent. For example, the first CC may be associated with a first set of parameter values for periodic CSI reporting, and the second CC may be associated with a second set of parameter values for periodic CSI reporting. The periodic CSI reporting configuration for the first CC may be determined based on the second set of parameter values applicable for the second CC.

In one design that may be applicable for the first scheme described above, the plurality of CCs may be arranged in at least two groups, with each group including at least one CC having the same system configuration. The first and second CCs may be in the same group. The UE may send CSI for each CC in each group on one of the at least one CC in the group.

In another design that may be applicable for the second and third schemes described above, the UE may send CSI for each of the plurality of CCs on a designated CC. In one design, all of the plurality of CCs may be associated with a single designated CC. The UE may send CSI for all CCs on this designated CC. In another design, each CC may be associated with a respective designated CC. The UE may send CSI for each CC on its designated CC. For both designs, the designated CC may be associated with the largest number of subframes available to send CSI, e.g., among the plurality of CCs. The designated CC may also be determined based on other criteria.

In yet another design that may be applicable for the fourth scheme described above, the UE may send CSI for each of the plurality of CCs on a primary CC used by the UE to send uplink control information. The UE may drop or delay transmission of CSI for the first CC scheduled to be sent in an uplink subframe of the first CC if this uplink subframe corresponds to a downlink subframe of the second CC.

In one design, the UE may determine a first subframe of the first CC in which to make measurements for CSI for the first CC based on a second subframe of the second CC in which to send the CSI for the first CC. For example, the first subframe may be the first available downlink subframe for the first CC that is at least a predetermined number of subframes (e.g., at least four subframes) earlier than the second subframe.

FIG. 8 shows a design of a process 800 for receiving CSI for multiple CCs with different system configurations. Process 800 may be performed by a base station/eNB (as described below) or by some other entity. The base station may determine a plurality of CCs configured for a UE (block 812). The plurality of CCs may include at least two CCs associated with different sets of subframes available to send CSI. The base station may receive CSI for a first CC sent by the UE on a second CC based on a set of subframes available to send CSI on the second CC (block 814). The plurality of CCs may include the first and second CCs.

In one design, the base station may independently determine a periodic CSI reporting configuration for each of the plurality of CCs. In another design, the base station may determine a periodic CSI reporting configuration for the first CC based on a system configuration of the second CC.

In one design, the plurality of CCs may be arranged in at least two groups, and each group may include at least one CC having the same system configuration. The first and second CCs may be in the same group. The base station may receive CSI for each CC in each group on one of the at least one CC in the group. In another design, the base station may receive CSI for each of the plurality of CCs on a designated CC. The designated CC may be associated with the largest number of subframes to send CSI or may be determined in other manners. In yet another design, the base station may receive CSI for each of the plurality of CCs on a primary CC, which may be used by the UE to send uplink control information.

Figure 9:
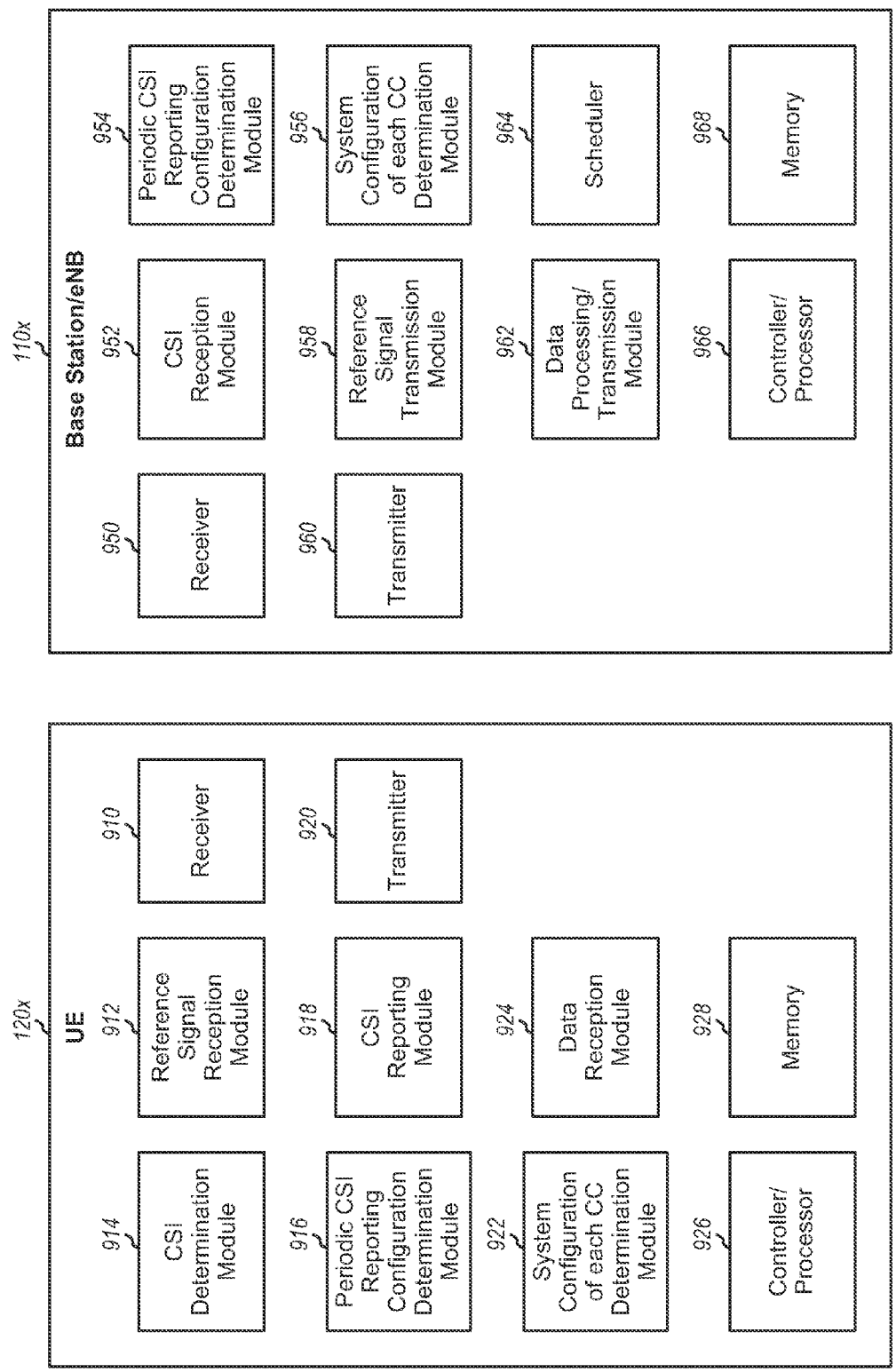
FIG. 9 shows a block diagram of a UE and a base station.

FIG. 9 shows a block diagram of a design of a UE 120x and a base station/eNB 110x, which may be one of the UEs and one of the eNBs in FIG. 1. Within UE 120x, a receiver 910 may receive signals transmitted by base stations, relays, etc. A module 912 may receive reference signals (e.g., CRS, CSI-RS, etc.) and may make measurements based on the reference signals. A module 914 may determine CSI (e.g., CQI, PMI, CDI, PTI, RI, etc.) for cells of interest based on the measurements. A module 922 may determine system configurations of multiple CCs configured for UE 120x for carrier aggregation. A module 916 may determine a periodic CSI reporting configuration of each of the multiple CCs. A module 918 may determine CSI for each CC based on information from modules 916 and 922. Module 918 may send the CSI for each CC on a CC designated to carry CSI for that CC. A transmitter 920 may transmit the CSI for all CCs as well as other information. A module 924 may receive transmissions of data sent based on the CSI and may process the received transmissions to recover the data. The various modules within UE 120x may operate as described above. A controller/processor 926 may direct the operation of various modules within UE 120x. A memory 928 may store data and program codes for UE 120x.

Within base station 110x, a receiver 950 may receive signals transmitted by UE 120x and other UEs. A module 952 may receive messages from UE 120x and extract CSI for the multiple CCs configured for UE 120x. A module 956 may determine the system configuration of the multiple CCs configured for UE 120x. A module 954 may determine periodic CSI reporting configurations for the multiple CCs based on the system configurations of these CCs and/or other information. Module 954 may convey the periodic CSI reporting configurations for the multiple CCs to UE 120x. Module 952 may receive CSI for the multiple CCs from UE 120x based on the periodic CSI reporting configurations of the multiple CCs. A module 962 may generate a transmission of data for UE 120x based on the CSI. Module 962 may determine the rank, modulation and coding scheme (MCS), and/or other parameters for transmission of data based on the CSI. Module 962 may also determine precoding vectors for transmission of data based on the CSI. Module 962 may generate transmission of data based on the various parameters determined from the CSI. A module 958 may generate reference signals. A transmitter 960 may transmit the reference signals, transmissions of data, and/or other information. The various modules within base station 110x may operate as described above. A scheduler 964 may schedule UEs for data transmission. A controller/processor 966 may direct the operation of various modules within base station 110x. A memory 968 may store data and program codes for base station 110x.

Figure 10:
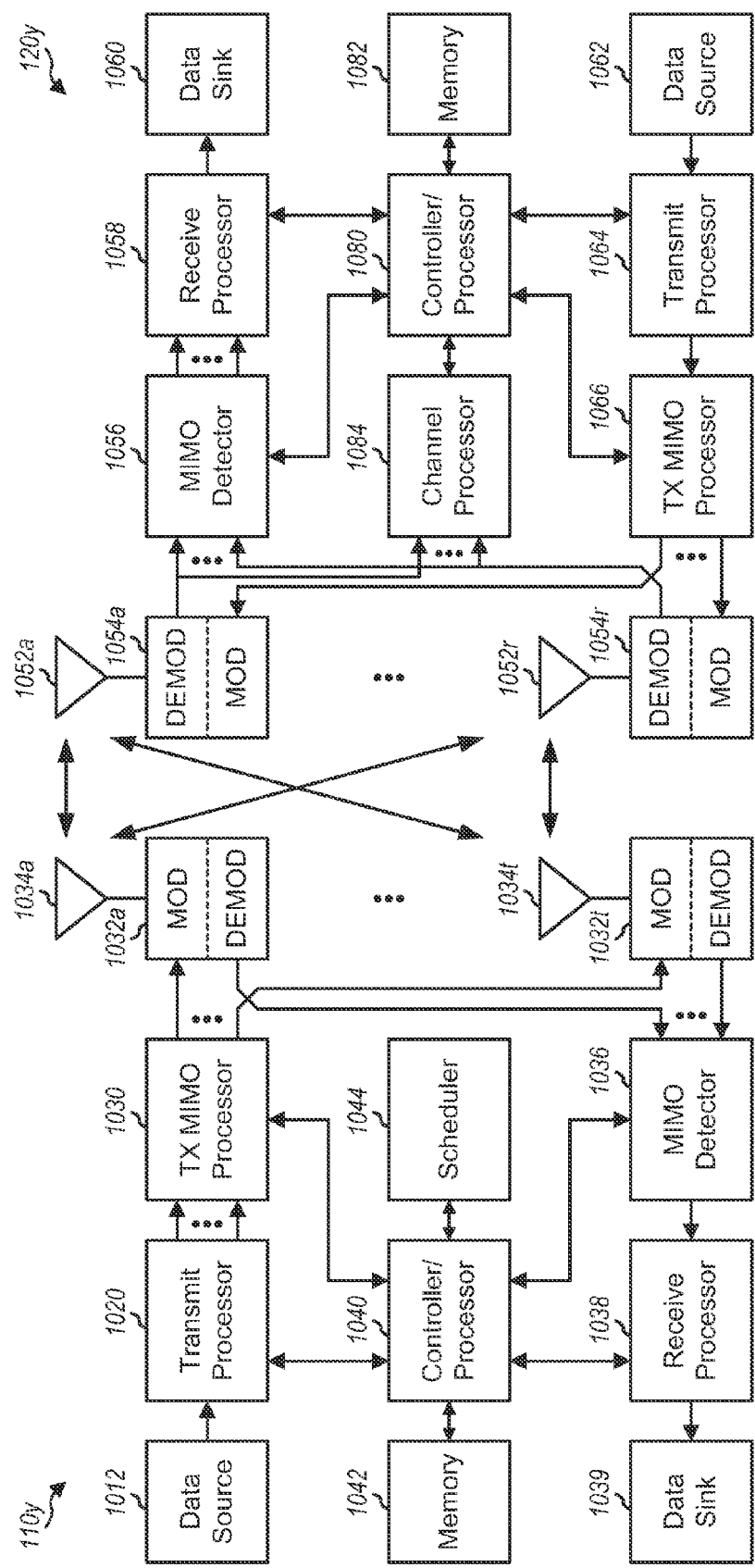
FIG. 10 shows another block diagram of a UE and a base station.

FIG. 10 shows a block diagram of a design of a base station/eNB 110y and a UE 120y, which may be one of the base stations and one of the UEs in FIG. 1. Base station 110y may be equipped with T antennas 1034a through 1034t, and UE 120y may be equipped with R antennas 1052a through 1052r, where in general T≥1 and R≥1.

At base station 110y, a transmit processor 1020 may receive data from a data source 1012 for one or more UEs, process (e.g., encode and modulate) the data for each UE based on one or more modulation and coding schemes selected for that UE, and provide data symbols for all UEs. Transmit processor 1020 may also process control information (e.g., for configuration messages, grants, etc.) and provide control symbols. Processor 1020 may also generate reference symbols for reference signals, e.g., CRS, CSI-RS, etc. A transmit (TX) MIMO processor 1030 may precode the data symbols, the control symbols, and/or the reference symbols (if applicable) and may provide T output symbol streams to T modulators (MOD) 1032a through 1032t. Each modulator 1032 may process its output symbol stream (e.g., for OFDM, etc.) to obtain an output sample stream. Each modulator 1032 may further condition (e.g., convert to analog, amplify, filter, and upconvert) its output sample stream to obtain a downlink signal. T downlink signals from modulators 1032a through 1032t may be transmitted via T antennas 1034a through 1034t, respectively.

At UE 120y, antennas 1052a through 1052r may receive the downlink signals from base station 110y and/or other nodes and may provide received signals to demodulators (DEMODs) 1054a through 1054r, respectively. Each demodulator 1054 may condition (e.g., filter, amplify, downconvert, and digitize) its received signal to obtain input samples. Each demodulator 1054 may further process the input samples (e.g., for OFDM, etc.) to obtain received symbols. A MIMO detector 1056 may obtain received symbols from all R demodulators 1054a through 1054r, perform MIMO detection, and provide detected symbols. A receive processor 1058 may process (e.g., demodulate and decode) the detected symbols, provide decoded data for UE 120y to a data sink 1060, and provide decoded control information to a controller/processor 1080. A channel processor 1084 may make measurements based on reference signals for each CC of interest. Processor 1080 and/or 1084 may determine CSI for each CC based on the measurements.

At UE 120y, a transmit processor 1064 may receive and process data from a data source 1062 and control information (e.g., CSI) from controller/processor 1080. Processor 1064 may also generate reference symbols for one or more reference signals. The symbols from transmit processor 1064 may be precoded by a TX MIMO processor 1066 if applicable, further processed by modulators 1054a through 1054r (e.g., for SC-FDM, OFDM, etc.), and transmitted. At base station 110y, the uplink signals from UE 120y and other UEs may be received by antennas 1034, processed by demodulators 1032, detected by a MIMO detector 1036 if applicable, and further processed by a receive processor 1038 to obtain decoded data and control information sent by UE 120y and other UEs. Processor 1038 may provide the decoded data to a data sink 1039 and the decoded control information to controller/processor 1040.

Controllers/processors 1040 and 1080 may direct the operation at base station 110y and UE 120y, respectively. Processor 1080 and/or other processors and modules at UE 120y may perform or direct process 700 in FIG. 7 and/or other processes for the techniques described herein. Processor 1040 and/or other processors and modules at base station 110y may perform or direct process 800 in FIG. 8 and/or other processes for the techniques described herein. Memories 1042 and 1082 may store data and program codes for base station 110y and UE 120y, respectively. A scheduler 1044 may schedule UEs for data transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or combinations thereof. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

The invention claimed is:

1. A method for wireless communication, comprising:
   determining a plurality of component carriers (CCs) configured for a user equipment (UE), the plurality of CCs including at least two CCs associated with different sets of subframes available to send channel state information (CSI);
   sending CSI for a first CC on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and
   sending CSI for each CC of the plurality of CCs on a designated CC, wherein the designated CC is associated with a largest number of uplink subframes available to send CSI among the plurality of CCs.

2. The method of claim 1, wherein each CC of the plurality of CCs is associated with a particular system configuration, the system configuration for each CC indicating whether frequency division duplex (FDD) or time division duplex (TDD) is utilized for the CC and a particular uplink-downlink configuration for the CC if TDD is utilized.

3. The method of claim 1, wherein each CC of the plurality of CCs is associated with a respective set of subframes available to send CSI on the CC and determined based on a system configuration of the CC.

4. The method of claim 1, wherein the at least two CCs include at least one CC configured for frequency division duplex (FDD) and at least one other CC configured for time division duplex (TDD).

5. The method of claim 1, wherein the at least two CCs are configured for time division duplex (TDD) with different uplink-downlink configurations.

6. The method of claim 1, further comprising:
   obtaining a periodic CSI reporting configuration for each CC of the plurality of CCs, the periodic CSI reporting configuration for each CC being independently determined for the CC.

7. The method of claim 1, wherein the plurality of CCs are arranged in at least two groups, each group including at least one CC having a same system configuration, the first and second CCs being in a same group, the method further comprising:
   sending CSI for each CC in each group on one of the at least one CC in the group.

8. The method of claim 1, further comprising:
   dropping or delaying transmission of CSI for the first CC, scheduled to be sent in an uplink subframe of the first CC, if the uplink subframe corresponds to a downlink subframe of the second CC.

9. The method of claim 1, further comprising:
   obtaining a periodic CSI reporting configuration for the first CC determined based on a system configuration of the second CC.

10. The method of claim 1, wherein the first CC is associated with a first set of parameter values for periodic CSI reporting, wherein the second CC is associated with a second set of parameter values for periodic CSI reporting, the method further comprising:
    obtaining a periodic CSI reporting configuration for the first CC determined based on the second set of parameter values for the second CC.

11. The method of claim 1, further comprising:
    determining a first subframe of the first CC in which to make measurements for CSI for the first CC based on a second subframe of the second CC in which to send the CSI for the first CC.

12. The method of claim 1, wherein the CSI comprises at least one of channel quality indicator (CQI), precoding matrix indicator (PMI), channel direction indication (CDI), precoding type indicator (PTI), or rank indicator (RI).

13. An apparatus for wireless communication, comprising:
    means for determining a plurality of component carriers (CCs) configured for a user equipment (UE), the plurality of CCs including at least two CCs associated with different sets of subframes available to send channel state information (CSI),
means for sending CSI for a first CC on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and
means for sending CSI for each CC of the plurality of CCs on a designated CC wherein the designated CC is associated with a largest number of uplink subframes available to send CSI among the plurality of CCs.

14. The apparatus of claim 13, wherein the plurality of CCs are arranged in at least two groups, each group including at least one CC having a same system configuration, the first and second CCs being in a same group, the apparatus further comprising:
means for sending CSI for each CC in each group on one of the at least one CC in the group.

15. The apparatus of claim 13, further comprising:
means for obtaining a periodic CSI reporting configuration for the first CC determined based on a system configuration of the second CC.

16. The apparatus of claim 13, further comprising:
means for determining a first subframe of the first CC in which to make measurements for CSI for the first CC based on a second subframe of the second CC in which to send the CSI for the first CC.

17. An apparatus for wireless communication, comprising:
at least one processor configured to:
determine a plurality of component carriers (CCs) configured for a user equipment (UE), the plurality of CCs including at least two CCs associated with different sets of subframes available to send channel state information (CSI), and
a transmitter configured to:
send CSI for a first CC on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration, and
sending CSI for each CC of the plurality of CCs on a designated CC, wherein the designated CC is associated with a largest number of uplink subframes available to send CSI among the plurality of CCs.

18. The apparatus of claim 17, wherein the plurality of CCs are arranged in at least two groups, each group including at least one CC having a same system configuration, the first and second CCs being in a same group, and wherein the at least one processor is configured to send CSI for each CC in each group on one of the at least one CC in the group.

19. The apparatus of claim 17, wherein the at least one processor is configured to obtain a periodic CSI reporting configuration for the first CC determined based on a system configuration of the second CC.

20. The apparatus of claim 17, wherein the at least one processor is configured to determine a first subframe of the first CC in which to make measurements for CSI for the first CC based on a second subframe of the second CC in which to send the CSI for the first CC.

21. A computer program product, comprising:
a non-transitory processor-readable medium comprising:
code for causing at least one processor to determine a plurality of component carriers (CCs) configured for a user equipment (UE), the plurality of CCs including at least two CCs associated with different sets of subframes available to send channel state information (CSI);
code for causing the at least one processor to send CSI for a first CC on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and
code for causing the at least one processer to send CSI for each CC of the plurality of CCs on a designated CC, wherein the designated CC is associated with a largest number of uplink subframes available to send CSI among the plurality of CCs.

22. A method for wireless communication, comprising:
determining a plurality of component carriers (CCs) configured for a user equipment (UE), the plurality of CCs including at least two CCs associated with different sets of subframes available to send channel state information (CSI);
receiving CSI for a first CC sent by the UE on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and
receiving CSI for each CC of the plurality of CCs on a designated CC, wherein the designated CC is associated with a largest number of uplink subframes available to send CSI among the plurality of CCs.

23. The method of claim 22, wherein each CC of the plurality of CCs is associated with a particular system configuration, the system configuration for each CC indicating whether frequency division duplex (FDD) or time division duplex (TDD) is utilized for the CC and a particular uplink-downlink configuration for the CC if TDD is utilized.

24. The method of claim 22, wherein the plurality of CCs are arranged in at least two groups, each group including at least one CC having a same system configuration, the first and second CCs being in a same group, the method further comprising:
receiving CSI for each CC in each group on one of the at least one CC in the group.

25. The method of claim 22, further comprising:
determining a periodic CSI reporting configuration for the first CC based on a system configuration of the second CC.

26. An apparatus for wireless communication, comprising:
means for determining a plurality of component carriers (CCs) configured for a user equipment (UE), the plurality of CCs including at least two CCs associated with different sets of subframes available to send channel state information (CSI);
means for receiving CSI for a first CC sent by the UE on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and means for receiving CSI for each CC of the plurality of CCs on a designated CC, wherein the designated CC is associated with a largest number of uplink subframes available to send CSI among the plurality of CCs.

27. The apparatus of claim 26, wherein the plurality of CCs are arranged in at least two groups, each group including at least one CC having a same system configuration, the first and second CCs being in a same group, the apparatus further comprising:

means for receiving CSI for each CC in each group on one of the at least one CC in the group.

28. The apparatus of claim 26, further comprising:

means for determining a periodic CSI reporting configuration for the first CC based on a system configuration of the second CC.

29. An apparatus for wireless communication, comprising:

at least one processor configured to:
   determine a plurality of component carriers (CCs) configured for a user equipment (UE), the plurality of CCs including at least two CCs associated with different sets of subframes available to send channel state information (CSI), and a receiver configured to:
   receive CSI for a first CC sent by the UE on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration, and
   receive CSI for each CC of the plurality of CCs on a designated CC, wherein the designated CC is associated with a largest number of uplink subframes available to send CSI among the plurality of CCs.

30. The apparatus of claim 29, wherein the plurality of CCs are arranged in at least two groups, each group including at least one CC having a same system configuration, the first and second CCs being in a same group, and wherein the at least one processor is configured to receive CSI for each CC in each group on one of the at least one CC in the group.

31. The apparatus of claim 29, wherein the at least one processor is configured to determine a periodic CSI reporting configuration for the first CC based on a system configuration of the second CC.

32. A computer program product, comprising:

a non-transitory processor-readable medium comprising:
   code for causing at least one processor to determine a plurality of component carriers (CCs) configured for a user equipment (UE), the plurality of CCs including at least two CCs associated with different sets of subframes available to send channel state information (CSI);
   code for causing the at least one processor to receive CSI for a first CC sent by the UE on a second CC based on a set of subframes available to send CSI on the second CC, the plurality of CCs including the first and second CCs, wherein the first CC, of the at least two CCs, is associated with a first system configuration and the second CC, of the at least two CCs, is associated with a second system configuration that is different from the first system configuration; and
   code for causing the at least one processor to receive CSI for each CC of the plurality of CCs on a designated CC, wherein the designated CC is associated with a largest number of uplink subframes available to send CSI among the plurality of CCs.

* * * * *